(12) United States Patent
Yamatsu

(10) Patent No.: US 7,184,183 B2
(45) Date of Patent: Feb. 27, 2007

(54) HOLOGRAM RECORDING/REPRODUCING APPARATUS AND HOLOGRAM RECORDING/REPRODUCING METHOD

(75) Inventor: Hisayuki Yamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 241 days.

(21) Appl. No.: 10/934,443

(22) Filed: Sep. 7, 2004

(65) Prior Publication Data
US 2005/0083561 A1  Apr. 21, 2005

(30) Foreign Application Priority Data
Sep. 9, 2003  (JP)  ............................. 2003-316875

(51) Int. Cl.
*G03H 1/12*  (2006.01)
(52) U.S. Cl. ............................. 359/11; 359/10; 359/24; 359/25; 369/103
(58) Field of Classification Search ................ 359/10, 359/11, 24, 25; 369/103
See application file for complete search history.

(56) References Cited

U.S. PATENT DOCUMENTS 5,943,145 A * 8/1999 Curtis et al. ................... 359/22
6,697,180 B1 * 2/2004 Wilson et al. ................. 359/11

* cited by examiner

*Primary Examiner*—Leonidas Boutsikaris
(74) *Attorney, Agent, or Firm*—Oblon, Spivak, McClelland, Maier & Neustadt, P.C.

(57) ABSTRACT

This invention provides a hologram recording apparatus for recording an interference fringe, generated by interference of a first light beam subjected to spatial light modulation by recording data with a second light beam, in a recording area of a hologram recording medium, the hologram recording apparatus including: a random phase body for randomizing the wave front of the second light beam, and a multiplex recording control unit for recording the interference fringe of the first light beam and the second light beam in the same recording area of the hologram recording medium each time the random phase body is rotated.

21 Claims, 6 Drawing Sheets

HOLOGRAM RECORDING/REPRODUCING APPARATUS AND HOLOGRAM RECORDING/REPRODUCING METHOD

BACKGROUND OF THE INVENTION

The present invention relates to a hologram recording/reproducing apparatus and a hologram recording/reproducing method, for performing hologram recording by interference of a recording beam having undergone spatial amplitude modulation with a speckle reference beam having an irregular speckle pattern.

In recent years, the holographic technology has been rapidly developed aiming at practical use of holographic memories which have been paid attention to as a strong storage candidate to compete with the next generation and the next next generation of optical disks, and a hologram recording/reproducing system for recording and reproduction of a large amount of data by utilizing the holographic technology has been proposed.

In the hologram storage based recording/reproduction system, a coherent laser beam is branched into a recording beam and a reference beam, and the recording beam is subjected to amplitude modulation according to recording data by a special light modulator (SLM). The modulated recording beam is condensed onto a hologram recording medium, when the hologram recording medium is irradiated also with the reference beam, so that the recording beam and the reference beam interfere with each other, and the resulting interference fringe is recorded on the hologram recording medium as a fine compression-rarefaction pattern.

For reproduction of the data recorded on the hologram recording medium, an illumination beam the same as the reference beam is made to be incident on the hologram recording medium at the same angle as the reference beam, whereby the data is reproduced as a diffracted beam corresponding to the interference fringe recorded on the hologram recording medium, the diffracted beam is received by an image pickup device such as CCD and CMOS, and the beam reception signal thus obtained is analyzed to thereby reproduce the data.

The storage capacity of hologram storage is determined by volume recording density, as contrasted to the storage capacity of optical disks which is determined by surface recording density. In the case of holographically recording the data, not that the recording data are recorded directly on the hologram recording medium but that an interference fringe of the recording beam and the reference beam is recorded. In the hologram storage, multiplex recording of the data is possible by utilizing a high dynamic range owing to the volume recording onto the hologram recording medium and the selectivity owing to Bragg analysis, and, by repeating the multiplex recording, a high capacity of more than several hundreds of Gbyte can be realized. Representative multiplexing systems include angle multiplexing, shift multiplexing, wavelength multiplexing, and phase modulation multiplexing.

Among the above-mentioned hologram recording multiplexing systems, the shift multiplexing is a method for performing multiplex recording by moving the recording site on the hologram recording medium in parallel little by little. In the shift multiplexing, however, a spherical wave is used as the reference beam, so that there is an anisotropy and the recording density can be raised only in one direction. Specifically, a shift selectivity of about 5 to 10 µm can be obtained in the directions in a plane including the individual optical axes of the reference beam and the recording beam, and the shift selectivity in the direction orthogonal to the plane would be about 1 mm. Therefore, in the case of a disk-like recording medium, when the shift selectivity in the circumferential direction of the recording track is set at about 5 to 10 µm to raise the recording density in this direction, the shift selectivity in the direction perpendicular to the recording track is about 1 mm, with the result that the recording track pitch is too wide to raise the recording density.

In view of the above, there is used a random phase multiplexing system for performing multiplex recording by moving the recording site on the hologram recording medium in parallel little by little while using a speckle reference beam having a speckle pattern as shown in FIG. 6. Since the wave front of the reference beam having the speckle pattern as in this case is at random, what corresponds to the shift selectivity is the autocorrelation length of the speckle pattern, which is sharp and is free of anisotropy. Therefore, where the recording medium is disk-like in shape, the autocorrelation lengths of the speckle pattern in the circumferential direction of the recording track and in the direction perpendicular to the circumferential direction can both be several micrometers, so that the recording density can be raised by narrowing the track pitch. These technologies are disclosed in the following reference: Vladimir B. Markov, James E. Millerd, and James D. Trolinger, "Multilayer holographic data multiplexing with random encoded reference beam", Part of the Joint International Symposium on Optical Memory and Optical Data Storage 1999.Koloa, Hi.July 1999: 100–102.

However, in the case of using the random phase multiplexing system as above-mentioned, the shift selectivity is sharp, so that in the case where the optical system is vibrated, the case where the hologram recording medium is swung, the case where the hologram recording medium is replaced and the like cases, the wave fronts of the reference beam and the illumination beam would not coincide with each other, it would be impossible to obtain a reproduced image, and the stability of the hologram recording/reproducing apparatus would be spoiled.

SUMMARY OF THE INVENTION

The present invention has been devised in consideration of the above-mentioned circumstances. Accordingly, it is an object of the present invention to provide a hologram recording/reproducing apparatus and a hologram recording/reproducing method by which multiplex recording of data in a high recording density can be performed without spoiling the stability of the apparatus, in performing multiplex recording of data by use of a reference beam whose wave front is randomized.

In order to attain the above object, according to a first aspect of the present invention, there is provided a hologram recording apparatus for recording an interference fringe, generated by interference of a first light beam subjected to spatial light modulation by recording data with a second light beam, in a recording area of a hologram recording medium, the hologram recording apparatus including: a random phase body for randomizing the wave front of the second light beam, and a multiplex recording control unit for recording the interference fringe of the first light beam and the second light beam in the same recording area of the hologram recording medium each time the random phase body is rotated.

Thus, in the hologram recording apparatus according to the present invention, when the random phase body is rotated, for example, in a plane orthogonal to the optical axis of the second light beam (reference beam), the wave front of the second light beam is also rotated according to the rotational angle, so that the wave front upon rotation can be regarded as a virtually different wave front. Therefore, when the interference fringe of the first light beam (recording beam) and the second light beam is previously recorded in the same recording area of the hologram recording medium each time the random phase body is rotated, the relevant data is reproduced from the area only in the case where the wave front of an illumination beam at the time of reproduction coincides with the wave front of the second light beam at the time of recording the data, whereas other data with different wave fronts at the time of recording are not reproduced, so that multiplex recording of data in the same recording area can be performed by rotating the random phase body.

The hologram recording apparatus according to the present invention may further include a moving unit for moving the recording area by a predetermined distance, wherein the multiplex recording control unit performs multiplex recording of the interference fringe of the first light beam and the second light beam in the recording area at the destination of the movement each time the random phase body is rotated by a predetermined angle.

Thus, in the hologram recording apparatus according to the present invention, a random phase shift multiplex recording of the data being the interference fringe of the first light beam and the second light beam is performed by moving the recording area of the hologram recording medium in parallel little by little, and, in this case, when multiplex recording of data by rotating the random phase body in the recording area at the destination of the movement is used jointly, the degree of multiplexing of the data can be increased remarkably. Therefore, though the degree of multiplexing in the random phase multiplexing is lowered when the stability of the apparatus is enhanced by making dull the shift selectivity in the random phase multiplexing, the lowering may be compensated for by multiplex recording of the data through the rotation of the random phase body used jointly, whereby it is possible to enhance the stability of the apparatus and to achieve high density recording.

In addition, according to a second aspect of the present invention, there is provided a hologram recording apparatus for recording an interference fringe, generated by interference of a first light beam subjected to spatial light modulation by recording data with a second light beam, in a recording area of a hologram recording medium, the hologram recording apparatus including: a random phase body for randomizing the wave front of the second light beam, a moving unit for moving the recording area by a predetermined distance, a random phase multiplexing unit for recording the interference fringe of the first light beam and the second light beam in the recording area at the destination of the movement each time the recording area is moved by the predetermined distance, and a multiplex recording control unit which, after the recording of the interference fringe in all the recording areas of the hologram recording medium by the random phase multiplexing unit, rotates the random phase body by a predetermined angle, and then again records the interference fringe in the recording areas of the hologram recording medium by the random phase multiplexing unit.

Thus, in the hologram recording apparatus according to the present invention, the random phase shift multiplex recording of the data being the interference fringe of the first light beam and the second light beam produced by the random phase body is performed by moving the recording area of the hologram recording medium in parallel little by little, whereby, after the multiplex recording of the data in all the recording areas of the hologram recording medium, the random phase body is rotated by the predetermined angle to thereby change the wave front of the second light beam, then multiplex recording of the data in all the recording areas of the hologram recording medium is again performed by the random phase shift multiplex recording, and thereafter the random phase body is rotated further by a predetermined angle and the random phase shift multiplex recording is repeated. As a result, the multiplex recording of the data by rotating the random phase body is performed in one area, whereby it is possible to jointly use both the random phase shift multiplex recording and the multiplex recording of the data by rotating the random phase body, and it is possible to enhance the stability of the apparatus and to achieve high density recording.

Besides, according to a third aspect of the present invention, there is provided a hologram recording method for recording an interference fringe, generated by interference of a first light beam subjected to spatial light modulation by recording data with a second light beam, in a recording area of a hologram recording medium, the hologram recording method including the steps of: randomizing the wave front of the second light beam by a random phase body, producing at least two kinds of the second light beams having different wave fronts by changing the rotational angle of the random phase body, and multiplexly recording a plurality of interference fringes, generated by the plurality of the second light beams and the first light beam, in the same recording area of the hologram recording medium.

Thus, in the hologram recording method according to the present invention, when the random phase body is rotated in a plane orthogonal to the optical axis of the second light beam (reference beam), the wave front of the second light beam becomes different according to the rotational angle. Therefore, when a plurality of interference fringes (data) produced by at least two kinds of the second light beams having at least different wave fronts are previously recorded in one recording area, the object data is reproduced from the area only in the case where the illumination beam at the time of reproduction coincides with the second light beam having the wave front at he time of recording the data, whereas other data with different wave fronts at the time of recording are not reproduced, so that multiplex recording of data in the same recording area can be achieved by rotating the random phase body.

In addition, according to a fourth aspect of the present invention, there is provided a hologram recording method for recording an interference fringe, generated by interference of a first light beam subjected to spatial light modulation by recording data with a second light beam, in a recording area of a hologram recording medium, the hologram recording method including: a step of randomizing the wave front of the second light beam by a random phase body, a step of rotating the random phase body by a predetermined angle, and a step of recording the interference fringe of the first light beam and the second light beam in the same recording area of the hologram recording medium each time the random phase body is rotated by the predetermined angle.

Thus, in the hologram recording method according to the present invention, when the random phase body is rotated, for example, in a plane orthogonal to the optical axis of the second light beam (reference beam), the wave front of the second light beam is also rotated according to the rotational angle of the random phase body, and the wave front can be regarded as a virtually different wave front. Therefore, when the interference fringe of the first light beam (recording beam) and the second light beam is previously recorded in the same recording area each time the random phase body is rotated, the relevant data is reproduced from the area only in the case where the wave front of an illumination beam at the time of reproduction coincides with the wave front of the second light beam at the time of recording the data, whereas other data with different wave fronts at the time of recording are not reproduced, so that multiplex recording of the data in the same recording area can be achieved by rotating the random phase body.

Besides, the hologram recording method according to the present invention may further include a step of moving the recording area by a predetermined distance, and a step of recording the interference fringe of the first light beam and the second light beam in the recording area at the destination of the movement each time the random phase body is rotated by a predetermined angle.

Thus, in the hologram recording method according to the present invention, a random phase shift multiplex recording of the interference fringe of the first beam and the second beam is performed by moving the recording area of the hologram recording medium in parallel little by little. In this case, by jointly using the multiplex recording of the data is conducted in the recording area at the destination of the movement by rotating the random phase body, the degree of multiplexing of the data can be increased remarkably. Therefore, though the degree of multiplexing in the random phase multiplexing is lowered when the stability of the apparatus is enhanced by making dull the shift selectivity in the random phase multiplexing, the lowered portion may be compensated for by jointly using the multiplex recording of the data by rotating the random phase body, whereby it is possible to enhance the stability of the apparatus and to achieve high density recording.

In addition, according to a fifth aspect of the present invention, there is provided a hologram recording method for recording an interference fringe, generated by interference of a first light beam subjected to spatial light modulation by recording data with a second light beam, in a recording area of a hologram recording medium, the hologram recording method including: a step of randomizing the wave front of the second light beam by a random phase body; a step of moving the recording area by a predetermined distance; a step of performing random phase shift multiplex recording of the interference fringe of the first light beam and the second light beam in the recording area at the destination of the movement each time the recording area is moved by the predetermined distance; a step of rotating the random phase body by a predetermined angle after all the interference fringes are recorded on the hologram recording medium by the random phase shift multiplex recording; and a step of again recording the interference fringe on the hologram recording medium by the random phase shift multiplex recording after the random phase body is rotated by the predetermined angle.

Thus, in the hologram recording method according to the present invention, a random phase shift multiplex recording of the data being the interference of the first light beam and the second light beam produced by the random phase body is performed by moving the recording area of the hologram recording medium in parallel little by little, whereby the multiplex recording of the data is conducted in all the recording areas of the hologram recording medium, then the random phase body is rotated by a predetermined angle to thereby change the wave front of the second light beam, thereafter the multiplex recording of the data in all the recording areas of the hologram recording medium is again conducted by the random phase shift multiplex recording, then the random phase body is rotated further by a predetermined angle, and the random phase shift multiplex recording is repeated. As a result, the multiplex recording of the data by rotating the random phase body is conducted in one area, whereby it is possible to jointly use both the random phase multiplexing and the multiplex recording of the data by rotating the random phase body, and it is possible to enhance the stability of the apparatus and to achieve high density recording.

Besides, according to a sixth aspect of the present invention, there is provided a hologram reproducing apparatus for reproducing data by photo-electric conversion of diffracted light generated by irradiating a recording medium of a hologram recording medium with an interference fringe recorded therein with a light beam which is produced by a random phase body and the wave from of which is randomized, the hologram reproducing apparatus including: a rotating portion for rotating the random phase body; and a reproduction control unit for reproducing the data to be reproduced by rotating the random phase body to the same angle as that when the data has been recorded and, thereafter, irradiating the recording area with the light beam produced by the random phase body.

Thus, in the hologram reproducing apparatus according to the present invention, the recording area of the hologram recording medium is irradiated with the light beam having the same wave front as that at the time of recording data, whereby the data is reproduced from the recording area. In this case, in the production of the light beam by the random phase body, the wave front would be different according to the rotational angle of the random phase body, and, therefore, the object data can be reproduced, distinctly from other data having undergone multiplex recording, only in the case of irradiation with the light beam which is produced when the random phase body is rotated to the same angle as that at the time of recording the data to be reproduced.

In addition, according to a seventh aspect of the present invention, there is provided a hologram reproducing method for reproducing data by photo-electric conversion of diffracted light generated by irradiating a recording area of a hologram recording medium with an interference fringe recorded therein with a light beam which is produced by a random phase body and the wave front of which is randomized, the hologram reproducing method including: a step of rotating the random phase body to the same angle as that when the data to be reproduced has been recorded, and a step of reproducing the data by irradiating the recording area with a light beam produced by the random phase body having been rotated.

Thus, in the hologram reproducing method according to the present invention, the recording area of the hologram recording medium is irradiated with the light beam which has the same wave front as that at the time of recording the data, whereby the data is reproduced from the recording area. In this case, in producing the light beam by the random phase body, the wave front would be different according to the rotational angle of the random phase body, and, therefore, the object data can be reproduced, distinctly from other data having undergone multiplex recording, only in the case of irradiation with the light beam produced when the random phase body is rotated to the same angle as that when the data to be reproduced has been recorded.

As has been described above, according to the present invention, in obtaining the reference beam by randomizing the wave front of the second light beam by the random phase body, the rotational angle of the random phase body is varied to produce at least two kinds of the second light beams having different wave fronts, and a plurality of interference fringes produced by the plurality of the second light beams and the first light beam being the recording beam are preliminarily recorded in the same recording area, whereby the object data can be reproduced from the recording area distinctly from other recording data only in the case of irradiation with the illumination beam having the same wave front as that of the second light beam at the time when the data has been recorded; therefore, multiplex recording of the data in the same recording area of the hologram recording medium can be achieved by varying the random state of the wave front of the light beam (reference beam) through rotating the random phase body.

In addition, by using the random phase shift multiplex recording and the multiplex recording by rotation of the random phase body mentioned above, the lowered portion of the degree of multiplexing in the random phase shift multiplex recording lowered when the stability of the apparatus is enhanced by making dull the shift selectivity in the random phase shift multiplex recording is compensated for by multiplex recording of data through rotation of the random phase body, whereby it is possible to perform multiplex recording of the data in a high recording density without spoiling the stability of the apparatus, in performing the multiplex recording of the data by use of the reference beam which is produced by the random phase body and the wave front of which is randomized.

BRIEF DESCRIPTION OF THE DRAWINGS

The above and other objects, features and advantages of the present invention will become apparent from the following description and appended claims, taken in conjunction with the accompanying drawings, in which:

DESCRIPTION OF THE PREFERRED EMBODIMENTS

The object of performing multiplex recording of data in a high recording density without spoiling the stability of the apparatus, in performing multiplex recording of the data by use of the reference beam having a randomized wave front, has been realized by jointly using the multiplex recording of the data in the recording area at the destination of the movement through rotation of the random phase body in performing random phase shift multiplex recording of the data by moving the recording area of the hologram recording medium in parallel little by little.

First Embodiment

Figure 1:
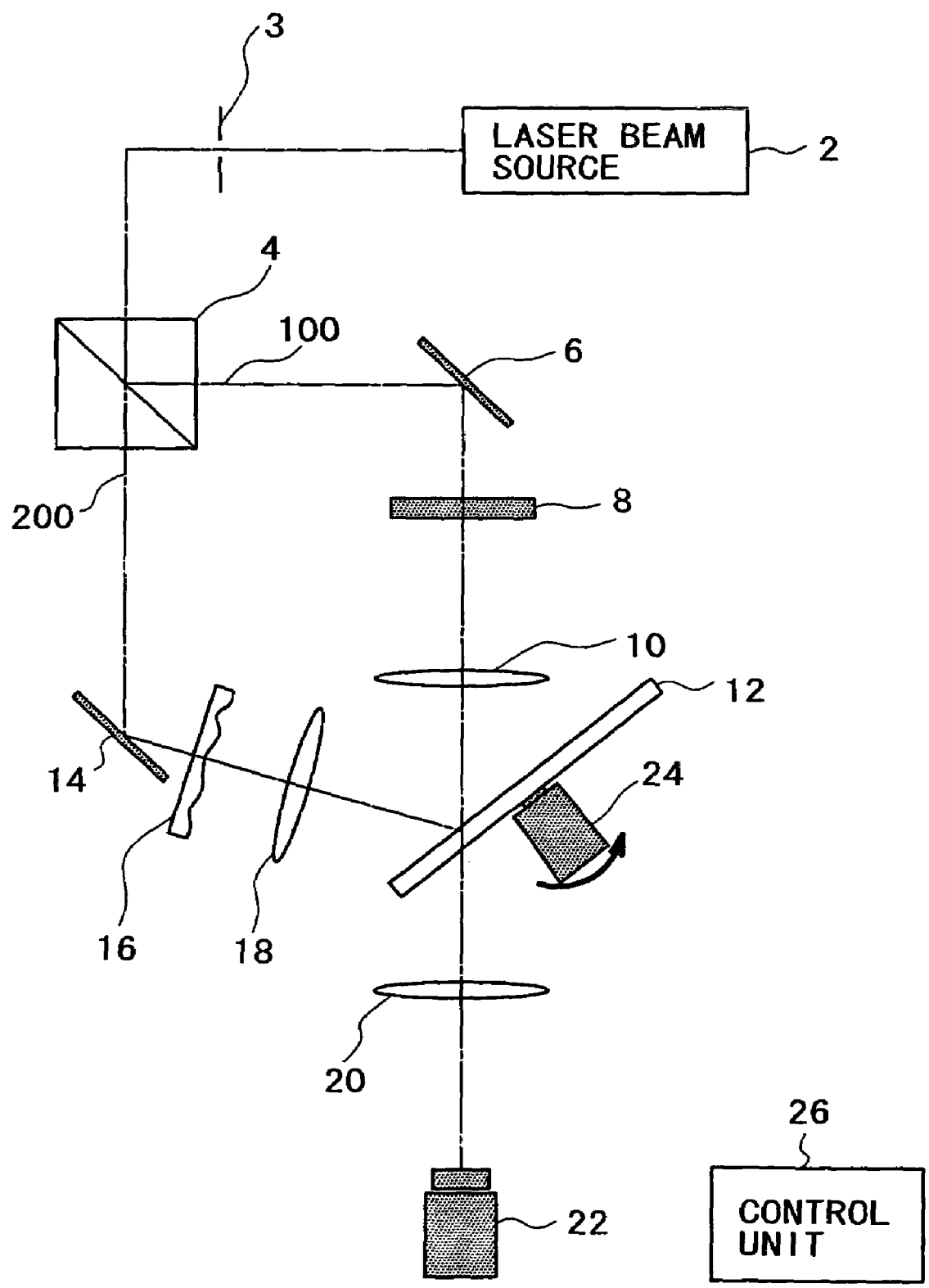
FIG. 1 is a schematic diagram showing the configuration of a hologram recording/reproducing apparatus according to a first embodiment of the present invention.

FIG. 1 is a schematic diagram showing the configuration of a hologram recording/reproducing apparatus according to a first embodiment of the present invention. The hologram recording/reproducing apparatus includes a laser beam source 2, a shutter 3, a beam splitter 4, a mirror 6, a spatial light modulator 8, a lens 10, a disk-like hologram recording medium (photo-polymer material or the like) 12, a mirror 14, a random phase body 16 such as ground glass, a lens 18, a lens 20, a detector 22, a spindle motor 24, and a control unit 26 as a multiplex recording control unit and a random phase multiplexing unit.

Next, operations according to this embodiment will be described. In FIG. 1, in the case where data is recorded on the hologram recording medium 12, under the condition where the shutter 3 is closed, the control unit 26 displays the data page to be recorded on the spatial light modulator (transmission-type liquid crystal display) 8, and rotates the spindle motor 24 to thereby determine the recording site (recording area) of the hologram recording medium 12, followed by opening the shutter 3.

As a result of this, a coherent laser beam emitted from the laser beam source 2 passes through the shutter 3 to be incident on the beam splitter 4, where it is branched into a recording beam 100 and a reference beam 200. The recording beam 100 is incident on the spatial light modulator 8 through the mirror 6, and the recording beam 100 undergoes spatial light modulation (amplitude modulation) by passing through the spatial light modulator 8 on which the data page is displayed. The modulated recording beam is condensed into the recording area on the hologram recording medium 12 by the lens 10.

Figure 2:
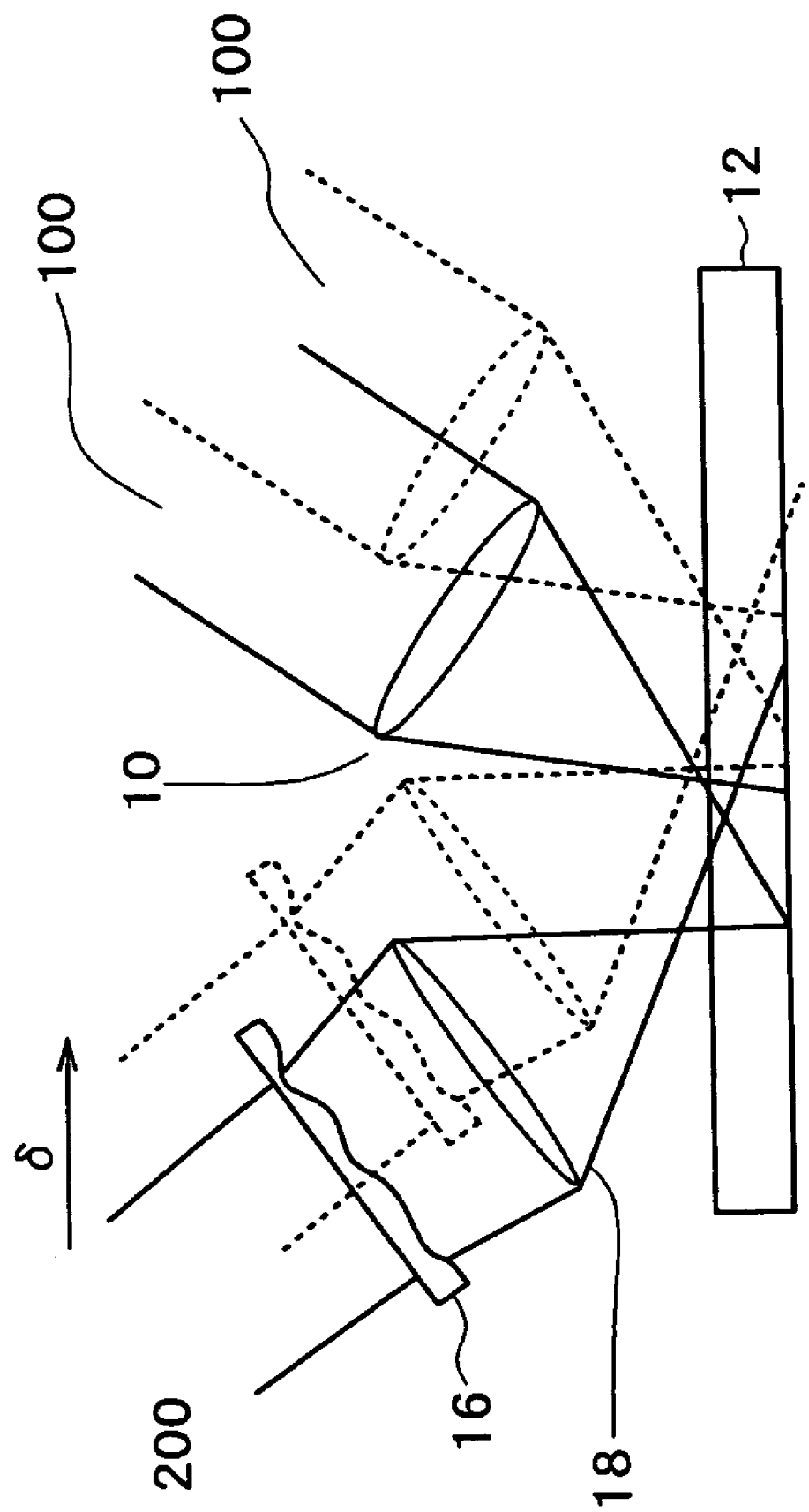
FIG. 2 is a diagram for illustrating a data recording method in the hologram recording/reproducing apparatus shown in FIG. 1.

On the other hand, the reference beam 200 is incident on the random phase body 16 through the mirror 14, whereby it is converted into the reference beam whose wave front is randomized, and then it is condensed to the same focus point on the hologram recording medium 12 as that for the recording beam 100. As a result, in the hologram recording medium 12 as shown in FIG. 2, the recording beam (solid lines) 100 and the reference beam (solid lines) 200 are superposed on each other at the focus point (recording spot) thereof, and the resulting interference fringe is recorded on the hologram recording medium 12 as a fine condensation-rarefaction pattern. Thereafter, the control unit 26 closes the shutter 3.

Next, the control unit 26 displays the data page to be recorded next on the spatial light modulator 8, and rotates the spindle motor 24 slightly to thereby move the hologram recording medium 12 by $\delta$, whereby the portion on which the recording beam 100 and the reference beam 200 are condensed is relatively moved by $\delta$, as shown in FIG. 2. When the control unit 26 opens the shutter 3 under this condition, the data page to be recorded next is holographically recorded in the focus region (recording area) for the recording beam (broken lines) 100 and the reference beam (broken lines) 200 of the hologram recording medium 12 by random phase shift multiplex recording.

Here, in this embodiment, such a random phase body 16 is used that the autocorrelation length $\sigma$ of a speckle pattern on the recording area irradiated with the reference beam 200 in the random phase shift multiplex recording is in the range of 100 to 300 μm. Therefore, the distance satisfies the relationship of $\delta > \sigma$.

Besides, in this embodiment, in addition to the random phase shift multiplex recording, a method is used in which the random phase body 16 is rotated by a rotation driver such as a stepping motor (not shown) to change the wave front of the reference beam 200, whereby the data is multiplexly recorded in the same recording area on the hologram recording medium 12.

Specifically, let the distance from the optical axis of the reference beam 200 on the hologram recording medium 12 to an edge of the reference beam 200 be r, and let the rotational angle of the random phase body 16 be θ, then the speckle movement amount by the rotation of the random phase body 16 at the reference beam edge is rθ. Therefore, it may be considered that the lowering of the reproduction beam intensity of the hologram recorded at θ=0 is started when at least rθ/2>σ, namely, when θ>2σ/r. In short, multiplex recording for recording the interference fringes (data) in the same area at the respective angles while rotating the random phase body 16 by Δθ=2σ/r can be realized.

Figure 3:
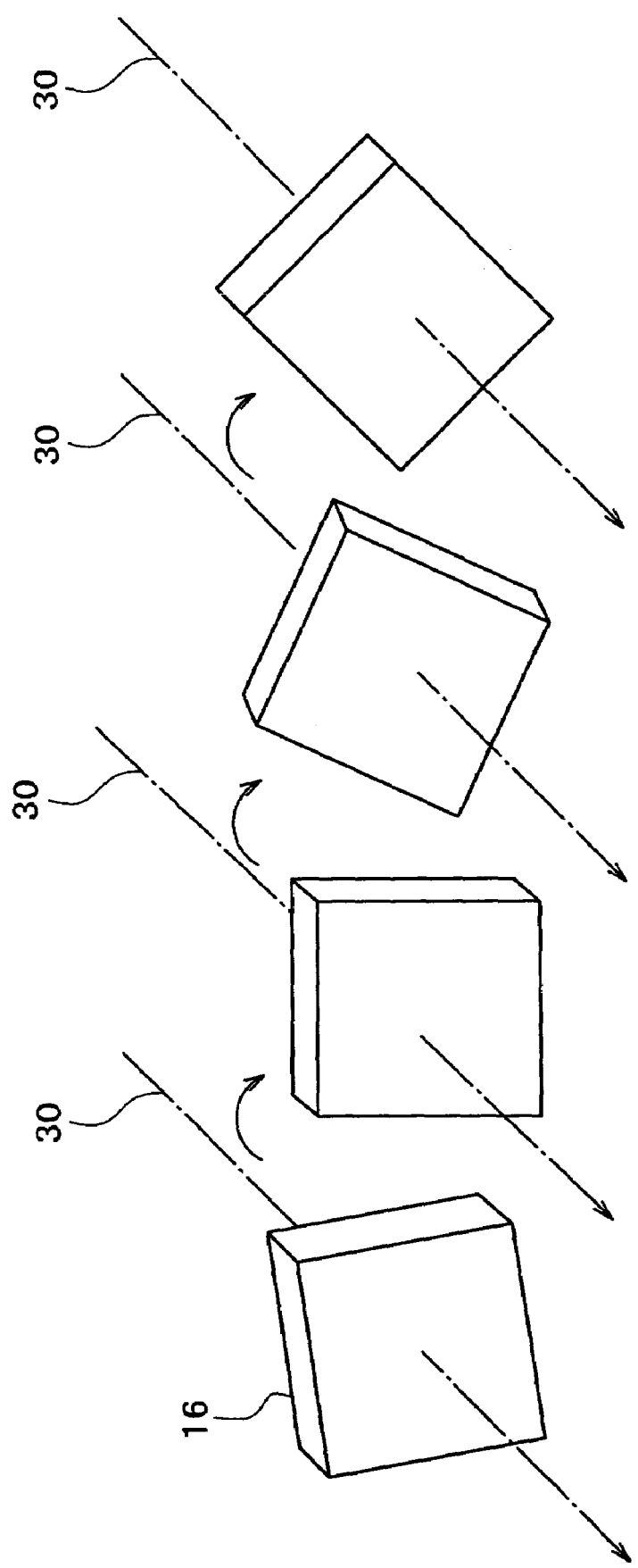
FIG. 3 shows diagrams showing examples of the rotated state of the random phase body shown in FIG. 1.

When the data have been recorded in all the recording tracks of the hologram recording medium 12 by the random phase multiplexing, the control unit 26 rotates the random phase body 16 by Δθ with the optical axis 30 of the reference beam 200 as a center so that the random phase body 16 is moved from the condition of FIG. 3A into the condition of FIG. 3B. Thereafter, the control unit 26 rotates the spindle motor 24 to select, for example, the recording area on the recording track where the recording has been started, and, further, displays the data page to be recorded next on the spatial light modulator 8.

When the control unit 26 opens the shutter 3 under this condition, the recording beam 100 and the reference beam 200 are condensed into the selected site on the hologram recording medium 12, and the data page to be recorded next is multiplexly recorded.

Subsequently, by use of the random phase body 16 rotated into the condition of FIG. 3B, recording in all the remaining recording areas of the hologram recording medium 12 is conducted by random phase multiplexing.

When the recording of the data in all the recording tracks of the hologram recording medium 12 is finished by use of the random phase body 16 rotated into the condition of FIG. 3B, the random phase body 16 is rotated by Δθ with the optical axis 30 of the reference beam 200 as a center so that the random phase body 16 is moved from the condition of FIG. 3B into the condition of FIG. 3C.

Thereafter, the spindle motor 24 is rotated to thereby select the recording area on the recording track where the recording has been started, and, further, the data page to be recorded next is displayed on the spatial light modulator 8 to thereby perform random phase multiplexting by use of the random phase body 16 being in the condition of FIG. 3C.

Subsequently, similarly, the random phase multiplexing on all the recording tracks of the hologram recording medium 12 is conducted by use of the random phase body 16 having been rotated further by Δθ into the condition of FIG. 3D. When the recording of the data is finished, the random phase multiplexing on all the recording tracks of the hologram recording medium 12 by use of the random phase body 16 having been further rotated by Δθ is continued.

Eventually, by performing the random phase multiplexing on all the recording tracks of the hologram recording medium 12 by use of the random phase body 16 in the rotational state next before returning to the random phase body 16 shown in FIG. 3A, the recording of the data on the hologram recording medium 12 is finished.

Here, on the assumption that the data pages are recorded by random phase multiplexing per 300 μm in both the rotational direction and the radial direction of the hologram recording medium (disk medium) 12, the number of data pages recorded in the same recording area of 2 mm×2 mm is 2 mm×2 mm/300 μm/300 μm=44 pages.

In view of the above, on the assumption that one data page has an information capacity of 1 Mbits and recording is conducted over an area of from a radial of 25 mm to a radial of 59 mm on the disk of 12 cm in diameter, the recording capacity is π(59 mm²−25 mm²)/(2 mm×2 mm)×44 pages×1 Mbits=98.7 Gbits=12.3 GB.

Next, in the case of multiplex recording of the data page by rotating the random phase body 16, let r=1.4 mm and let σ=300 μm in the same manner as above, then Δθ=0.428 rad=24.5 degrees. Therefore, the multiplex of the data can be performed 14 times during one rotation of the random phase body.

Meanwhile, in this embodiment, the hologram multiplex recording method in which the random phase body 16 is rotated and the above-mentioned recording method based on random phase multiplexing for multiplexing by moving the relative positions of the medium and the optical system are used in combination with each other. Therefore, in the case where the random phase body 16 with σ=300 μm is used and the hologram is recorded in the area from a radius of 25 mm to a radius of 59 mm of the 12 cm disk, the recording capacity is 12.3 GB×14=172 GB.

In the next place, operations for reproducing the data from the hologram medium 12 on which the data pages have been recorded will be described. First, the control unit 26 closes the shutter (not shown) interposed between the beam splitter 4 and the mirror 6, thereafter puts the random phase body 16 into, for example, the condition shown in FIG. 3A, and then condenses the illumination beam being the same as the reference beam 200 onto the recording track of the hologram recording medium 12 through the beam splitter 4, the mirror 14, the random phase body 16, and the lens 18. As a result, a diffracted beam corresponding to the interference fringe recorded on the recording track of the hologram recording medium 12 is generated, the diffracted beam is received through condensation onto an image pickup device in the detector 22 by the lens 20, and the beam reception signal thus obtained is analyzed, to yield the original image data (data page).

Thereafter, the control unit 26 rotates the spindle motor 24 to thereby move the recording track of the hologram recording medium 12 by δ in the circumferential direction, and this portion is irradiated with the illumination beam, whereby another data page recorded on the random phase body 16 in the condition shown in FIG. 3A is reproduced. In other words, where the illumination beam generated by putting the random phase body 16 into the condition shown in FIG. 3A is used, all the data in the hologram recording medium 12 recorded by random phase recording in the rotational condition shown in FIG. 3A of the random phase body 16 can be reproduced.

Next, the random phase body 16 is rotated by Δθ to put the random phase body 16 into the state shown in FIG. 3B, and the same procedure as above is carried out, whereby all the data in the hologram recording medium 12 recorded by random phase recording in the rotational state shown in FIG. 3B of the random phase body 16 can be reproduced.

Therefore, in the case where a specified data page in the hologram recording medium 12 is to be reproduced, the recording area on the recording track of the hologram recording medium 12 in which the data page has been recorded is irradiated with the illumination beam which is obtained through the random phase body 16 in the same rotational angle condition as that when the object data has been recorded and the wave front of which has been randomized, whereby the specified data page can be reproduced.

According to this embodiment, since the shift selectivities at the times of hologram recording and reproduction are made dull by setting the autocorrelation length σ of the speckle pattern at 300 μm, the possibility that the reference beam 200 and the illumination beam might not coincide with each other is eliminated even upon replacement of the hologram recording medium 12 or in the like cases and even where there is some vibration of the optical system or some oscillation of the hologram recording medium 12; therefore, it is possible to stably read the recording data and to enhance the stability of the hologram recording/reproducing apparatus.

In addition, the recording density in the random phase multiplexing system is lowered by an amount corresponding to the extent of making the shift selectivities dull, for example, lowered to 12.3 GB/disk in the above-mentioned example. In this embodiment, however, the multiplex recording method by rotating the random phase body 16 is used in combination with the random phase shift multiplex recording method, whereby the recording capacity can be set to, for example, 172 GB/disk, which is much higher than 100 GB. Therefore, the hologram recording/reproducing apparatus according to this embodiment can achieve a high recording density without spoiling the stability of the apparatus.

Second Embodiment

Figure 4:
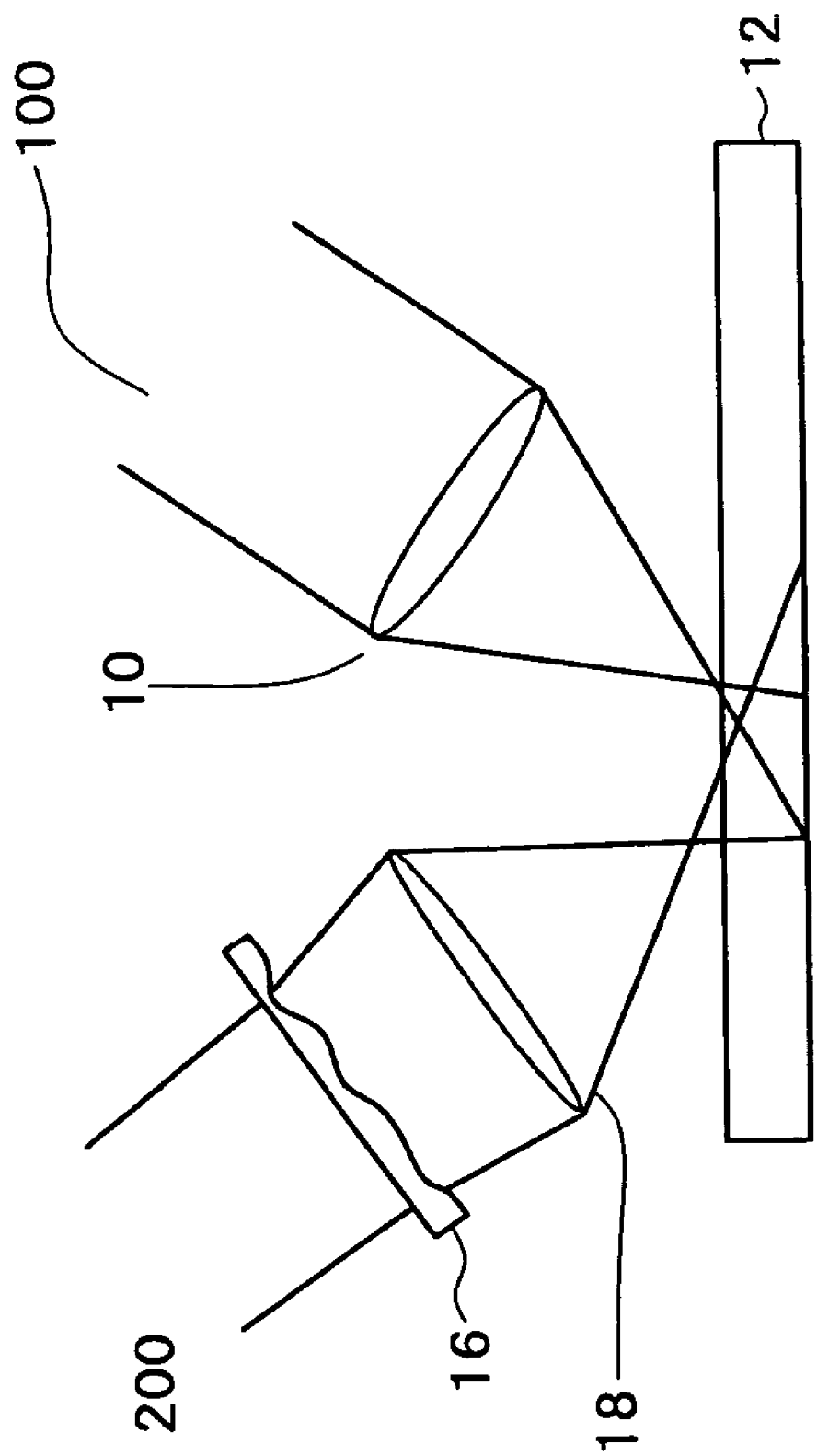
FIG. 4 is a schematic diagram for illustrating a hologram recording method according to a second embodiment of the present invention.

FIG. 4 is a schematic diagram for illustrating a hologram recording method according to a second embodiment of the present invention. The same components as those in the first embodiments are denoted by the same symbols as used above, in the following description.

In this embodiment, also, in the same manner as in the first embodiment, a recording beam 100 having undergone amplitude modulation by a spatial light modulator (not shown) with display of a data page is condensed into a recording area of a hologram recording medium 12 by a lens 10. Simultaneously, a reference beam 200 with its wave front randomized by passing through the random phase body 16 of which the rotational angle in a plane orthogonal to the optical axis 30 of the reference beam 200 is in the state shown in FIG. 5A is condensed into the recording area of the hologram recording medium 12 by a lens 18, and an interference fringe of both the beams is recorded in this recording area.

Figure 5:
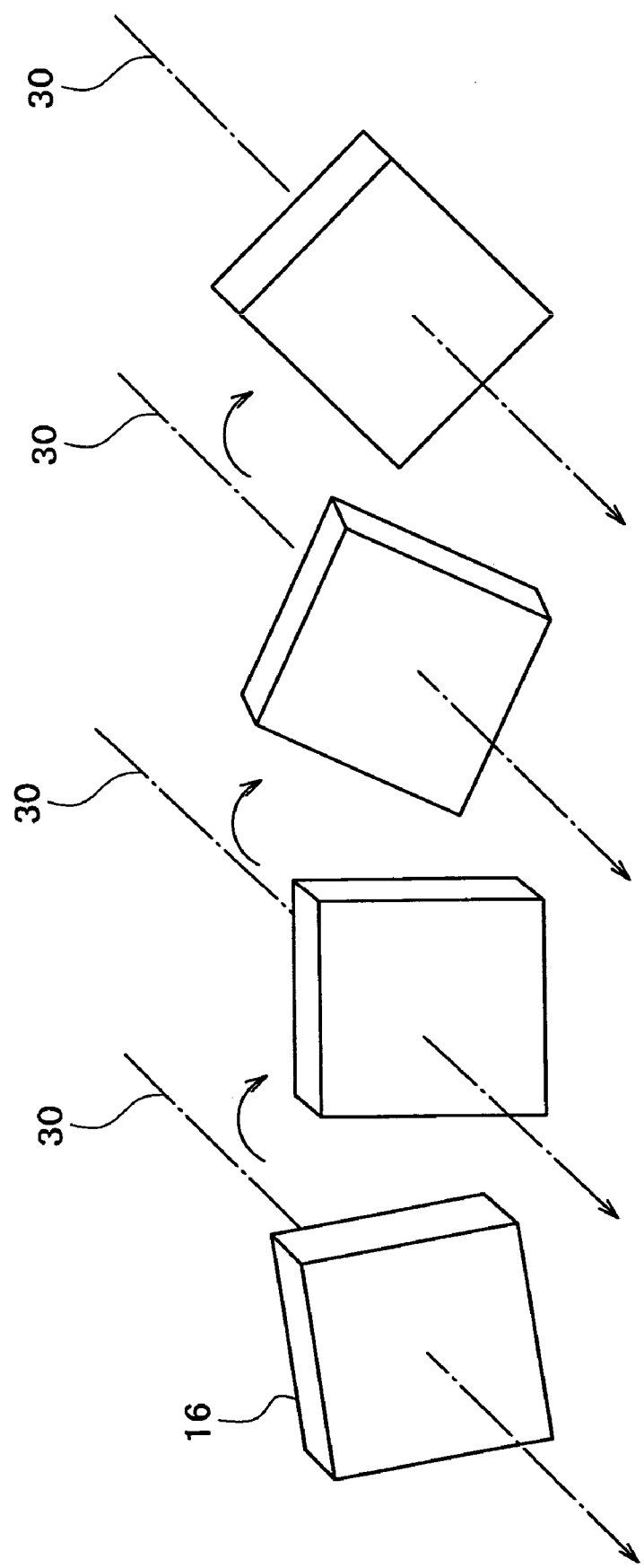
FIG. 5 shows diagrams showing examples of the rotated state of the random phase-body shown in FIG. 4.
Figure 6:
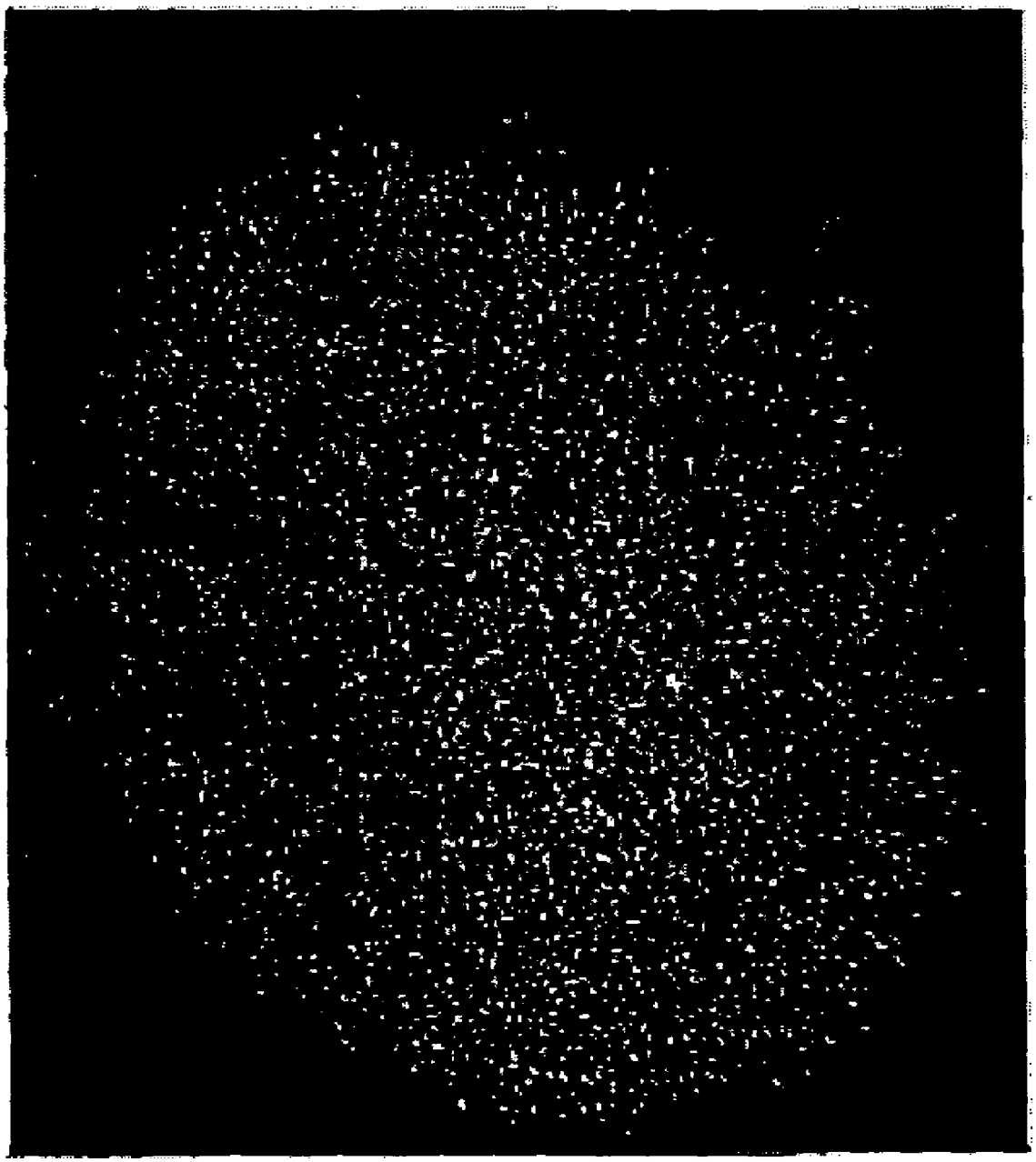
FIG. 6 is a diagram showing an example of the speckle pattern possessed by the reference beam of which the wave front has been disordered (randomized) through the random phase body.

Next, the random phase body 16 is rotated by Δθ to be put into the state shown in FIG. 5B, and, by use of a reference beam 200 produced thereby and a recording beam 100 having undergone amplitude modulation by the data page to be recorded next, multiplex recording of the data is performed in the same recording area as above of the hologram recording medium 12. In this case, it is assumed that let the autocorrelation length of a speckle pattern on the recording area irradiated with the reference beam 200 be σ, then the relationship of Δθ=2σ/r is satisfied.

Subsequently, in the same manner as above, the random phase body 16 is rotated by Δθ at a time to be put sequentially into the conditions of FIGS. 5C, 5D, . . . , and multiplex recording of data into the same recording area as above is conducted until one rotation of the random phase body 16 is completed. When the multiplex recording of data into the same recording area until the completion of one rotation of the random phase body 16 has been performed in this manner, an operation of moving the hologram recording medium 12 in parallel by δ(δ>σ) and performing data multiplex recording in the recording area at the destination of the movement by rotating the random phase body 16 by Δθ at a time is repeated.

When the data multiplexing by the rotation of the random phase body 16 has been performed in this manner, the hologram recording medium 12 is moved further by δ in parallel, the data multiplex recording in the recording area at the destination of the movement by the rotation of the random phase body 16 is conducted, and the rotation of the random phase body 16 and the shift of the hologram recording medium 12 are repeated, whereby random phase shift multiplex recording of the data on all the recording tracks of the hologram recording medium 12 is performed, and data multiplex recording by the rotation of the random phase body 16 is conducted.

According to this embodiment, after data multiplexing by the rotation of the random phase body 16 is conducted in the recording area of the hologram recording medium 12, the recording area is moved in parallel by δ for a shift to the next recording area, data multiplex recording by the rotation of the random phase body 16 is performed in the recording area at the destination of the movement, thereafter the recording area is moved further by δ in parallel for a shift to the next recording area, and such series of operation are repeated, to subject the hologram recording medium 12 to multiplex recording composed of a combination of the random phase shift multiplex recording and the data multiplex recording by the rotation of the random phase body 16, whereby the shift selectivity is made dull, the stability of the hologram recording/reproducing apparatus can be thereby enhanced, and the recording density of the hologram recording medium 12 can be enhanced.

Incidentally, the difference between this embodiment and the first embodiment lies in only that the recording order of the random phase shift multiplex recording and the data multiplex recording by the rotation of the random phase body 16 is reversed, whereas the mode of data multiplex recording in each recording area of the hologram recording medium 12 after recording is quite the same. Therefore, the method of reproducing the data from the hologram recording medium 12 in this embodiment is the same as that in the first embodiment, and the object data can be reproduced distinctly from the other multiplexly recorded data by irradiating the recording area with the object data recorded therein of the hologram recording medium 12 with an illumination beam produced when the random phase body 16 is rotated to the same angle as that when the data to be reproduced has been recorded.

In addition, in the case where data are recorded on the hologram recording medium 12 by the recording method according to this embodiment, the data multiplexly recorded in one recording area of the hologram recording medium 12 are sequentially read out by irradiating the recording area with the illumination beam produced by rotating the random phase body 16 by Δθ at a time, all the data multiplexly recorded in the recording area are read out, upon which the hologram recording medium 12 is moved by δ for a shift to the next recording area, all the data multiplexly recorded in the recording area are read out, a further shift to the next recording area is conducted, and such operations are repeated, whereby the data can be read out continuously.

Here, in the second embodiment as above, the random phase multiplexing is conducted under the condition where the distance by which the recording area is moved in parallel is δ and the distance δ is greater than the autocorrelation length σ. However, also in the case where overlapping of each recording area is avoided by setting δ to be much greater than σ and the random phase shift multiplex recording is not performed, it is possible to perform multiplex recording of data in each recording area by the rotation of the random phase body 16, whereby the recording density of the hologram recording medium 12 can be enhanced, as compared with the case where multiplexing is not performed.

Incidentally, the present invention is not limited to the above-described embodiments, and various modifications in specific configurations, functions, actions, and effects are possible within the scope of the gist of the invention. For example, in the above embodiment a glass has been assumed to be used as the random phase body 16, the random phase body 16 may be configured by adhering a translucent tape to a transparent glass, whereby the same effects as above can be obtained.

Besides, while a disk-type medium has been assumed as the hologram recording medium 12 in the above embodiments, the present invention is applicable to other forms of hologram recording media, with the result of the same effects as above.

What is claimed is:

1. A hologram recording apparatus for recording an interference fringe, generated by interference of a first light beam subjected to spatial light modulation by recording data with a second light beam, in a recording area of a hologram recording medium, said hologram recording apparatus comprising:

a random phase body configured to randomize the wave front of said second light beam, and a multiplex recording control unit configured to record said interference fringe of said first light beam and said second light beam in the same recording area of said hologram recording medium each time said random phase body is rotated by a predetermined angle θ, wherein θ>2σ/r, σ is an autocorrelation length of a speckle pattern on said recording area irradiated with said second light beam, and r is a distance measured along said random phase body, from a central optical axis of said second light beam to an edge of said second light beam.

2. A hologram recording apparatus as set forth in claim 1, further comprising:

a moving unit configured to move said recording area by a predetermined distance, wherein said multiplex recording control unit performs multiplex recording of said interference fringe of said first light beam and said second light beam in the recording area at the destination of said movement each time said random phase body is rotated by said predetermined angle.

3. A hologram recording apparatus as set forth in claim 2, satisfying the relationship of δ>σ, where σ is the autocorrelation length of a speckle pattern on said recording area irradiated with said second light beam, and δ is said predetermined distance by which said recording area is moved.

4. A hologram recording apparatus for recording an interference fringe, generated by interference of a first light beam subjected to spatial light modulation by recording data with a second light beam, in a recording area of a hologram recording medium, said hologram recording apparatus comprising:

a random phase body configured to randomize the wave front of said second light beam;

a moving unit configured to move said recording area by a predetermined distance;

a random phase multiplexing unit configured to record said interference fringe of said first light beam and said second light beam in said recording area at the destination of said movement each time said recording area is moved by said predetermined distance; and a multiplex recording control unit which, after the recording of said interference fringe in all the recording areas of said hologram recording medium by said random phase multiplexing unit, rotates said random phase body by a predetermined angle θ, and then again records said interference fringe in said recording areas of said hologram recording medium by said random phase multiplexing unit, wherein θ>2σ/r, σ is an autocorrelation length of a speckle pattern on said recording area irradiated with said second light beam, and r is a distance measured along said random phase body, from a central optical axis of said second light beam to an edge of said second light beam.

5. A hologram recording apparatus as set forth in claim 4, satisfying the relationship of δ>σ, where σ is the autocorrelation length of a speckle pattern on said recording area irradiated with said second light beam, and δ is said predetermined distance by which said recording area is moved.

6. A hologram recording apparatus as set forth in claim 5, wherein said σ is not less than 100 μm.

7. A hologram recording apparatus as set forth in claim 4, wherein said σ is not less than 100 μm.

8. A hologram recording method for recording an interference fringe, generated by interference of a first light beam subjected to spatial light modulation by recording data with a second light beam, in a recording area of a hologram recording medium, said hologram recording method comprising:

randomizing the wave front of said second light beam by a random phase body;

producing at least two kinds of said second light beams having different wave fronts by changing a rotational angle with a predetermined angle θ of said random phase body, such that θ>2σ/r, where σ is an autocorrelation length of a speckle pattern on said recording area irradiated with said second light beam, and r is a distance measured along said random phase body, from a central optical axis of said second light beam to an edge of said second light beam; and multiplexly recording a plurality of interference fringes, generated by the plurality of said second light beams and said first light beam, in the same recording area of said hologram recording medium.

9. A hologram recording method for recording an interference fringe, generated by interference of a first light beam subjected to spatial light modulation by recording data with a second light beam, in a recording area of a hologram recording medium, said hologram recording method comprising:

a step of randomizing the wave front of said second light beam by a random phase body;

a step of rotating said random phase body by a predetermined angle θ such that θ>2σ/r, where σ is an autocorrelation length of a speckle pattern on said recording area irradiated with said second light beam, and r is a distance measured along said random phase body, from a central optical axis of said second light beam to an edge of said second light beam; and a step of recording said interference fringe of said first light beam and said second light beam in the same recording area of said hologram recording medium each time said random phase body is rotated by said predetermined angle.

10. A hologram recording method as set forth in claim 9, further comprising a step of recording said interference fringe of said first light beam and said second light beam in said recording area at the destination of said movement each time said random phase body is rotated by the predetermined angle.

11. A hologram recording method as set forth in claim 10, satisfying the relationship of δ>σ, where σ is the autocorrelation length of a speckle pattern on said recording area irradiated with said second light beam, and δ is said predetermined distance by which said recording area is moved.

12. A hologram recording method for recording an interference fringe, generated by interference of a first light beam subjected to spatial light modulation by recording data with a second light beam, in a recording area of a hologram recording medium, said hologram recording method comprising:

a step of randomizing the wave front of said second light beam by a random phase body;

a step of moving said recording area by a predetermined distance;

a step of performing random phase shift multiplex recording of said interference fringe of said first light beam and said second light beam in said recording area at the destination of said movement each time said recording area is moved by said predetermined distance;

a step of rotating said random phase body by a predetermined angle θ after all said interference fringes are recorded on said hologram recording medium by said random phase shift multiplex recording, such that θ>2σ/r, where σ is an autocorrelation length of a speckle pattern on said recording area irradiated with said second light beam, and r is a distance measured along said random phase body, from a central optical axis of said second light beam to an edge of said second light beam; and a step of again recording said interference fringe on said hologram recording medium by said random phase shift multiplex recording after said random phase body is rotated by said predetermined angle.

13. A hologram recording method as set forth in claim 12, satisfying the relationship of δ>σ, where σ is the autocorrelation length of a speckle pattern on said recording area irradiated with said second light beam, and δ is said predetermined distance by which said recording area is moved.

14. A hologram recording method as set forth in claim 13, wherein said σ is not less than 100 μm.

15. A hologram recording method as set forth in claim 12, wherein said σ is not less than 100 μm.

16. A hologram reproducing apparatus for reproducing data by photo-electric conversion of diffracted light generated by irradiating a recording medium of a hologram recording medium with an interference fringe recorded therein with a light beam which is produced by a random phase body and the wave from of which is randomized, said hologram reproducing apparatus comprising:

a rotating portion configured to rotate said random phase body with a predetermined angle θ; and a reproduction control unit configured to reproduce said data to be reproduced by rotating said random phase body to the same angle as that when said data has been recorded and, thereafter, irradiating said recording area with said light beam produced by said random phase body, wherein θ>2σ/r, σ is an autocorrelation length of a speckle pattern on said recording area irradiated with said second light beam, and r is a distance measured along said random phase body, from a central optical axis of said second light beam to an edge of said second light beam.

17. A hologram reproducing apparatus as set forth in claim 16, further comprising a moving unit for moving said hologram recording medium so that said recording area is moved by a predetermined distance, wherein said reproduction control unit so function that the data are sequentially reproduced from each said recording area on said hologram recording medium by moving said hologram recording medium by a predetermined distance at a time while using said light beam produced by said random phase body having a certain rotational angle, then, when reproduction of said data from all said recording areas on said hologram recording medium is finished, the data are sequentially reproduced from each said recording area on said hologram recording medium by moving said hologram recording medium by a predetermined distance at a time while using said light beam produced by rotating said random phase body by a predetermined angle, and, when reproduction of the data from all said recording areas on said hologram recording medium is finished, said random phase body is rotated further by a predetermined angle and the above-mentioned operations are repeated, whereby the data are continuously read out of said hologram recording medium.

18. A hologram reproducing apparatus as set forth in claim 16, further comprising a moving unit for moving said hologram recording medium so that said recording area is moved by a predetermined distance, wherein said reproduction controlling means so functions that the data multiplexly recorded in one recording area of said hologram recording medium are sequentially read out by use of the light beams produced by rotating said random phase body by a predetermined angle at a time, whereby all the data multiplexly recorded in said recording area are read out, thereafter said hologram recording medium is moved by a predetermined distance to thereby set the next recording area in position, all the data multiplexly recorded in the new recording area are sequentially read out by use of said light beams produced by rotating said random phase body by a predetermined angle at a time, then, further, the next recording area is set in position, and the above-mentioned operations are repeated, whereby the data are continuously read out.

19. A hologram reproducing method for reproducing data by photo-electric conversion of diffracted light generated by irradiating a recording area of a hologram recording medium with an interference fringe recorded therein with a light beam which is produced by a random phase body and the wave front of which is randomized, said hologram reproducing method comprising:

a step of rotating said random phase body to the same angle as that when the data to be reproduced has been recorded; and a step of reproducing the data by irradiating said recording area with a light beam produced by said random phase body having been rotated with a predetermined angle θ, wherein θ>2 σ/r, σ is an autocorrelation length of a speckle pattern on said recording area irradiated with said second light beam, and r is a distance measured along said random phase body, from a central optical axis of said second light beam medium to an edge of said second light beam.

20. A hologram reproducing method as set forth in claim 19, wherein in said reproducing step, the data are sequentially reproduced from each said recording area on said hologram recording medium by moving said hologram recording medium by a predetermined distance at a time while using said light beam produced by said random phase body having a certain rotational angle;

when reproduction of the data from all said recording areas on said hologram recording medium is finished, the data are sequentially reproduced from each said recording area on said hologram recording medium by moving said hologram recording medium by a predetermined distance at a time while using said light beam produced by rotating said random phase body by a predetermined angle; and when reproduction of the data from all said recording areas on said hologram recording medium is finished, said random phase body is further rotated by a predetermined angle, and the above-mentioned operations are repeated, whereby the data are sequentially read out of said hologram recording medium.

21. A hologram reproducing apparatus as set forth in claim 19, wherein in said reproducing step, the data multiplexly recorded in one recording area of said hologram recording medium are sequentially reproduced by use of the light beams produced by rotating said random phase body by a predetermined angle at a time;

after all the data multiplexly recorded in said one recording area are read out, the hologram recording medium is moved by a predetermined distance to set the next recording area in position;

all the data multiplexly recorded in the new recording area are sequentially read out by use of the light beams produced by rotating said random phase body by a predetermined angle at a time; and further, the next recording are is set in position, and the above-mentioned reproducing operations are repeated, whereby the data are continuously read out.

* * * * *